United States Patent

Ramsay et al.

[15] 3,694,659

[45] Sept. 26, 1972

[54] AUTOMATIC CONTROL CIRCUIT FOR IMAGE INTENSIFIER

[72] Inventors: Melvin Murray Ramsay, Broxbourne; William Geddes Barnes, Harlow, both of England

[73] Assignee: International Standard Electric Corporation, New York, N.Y.

[22] Filed: Sept. 15, 1971

[21] Appl. No.: 180,589

[52] U.S. Cl. ............250/213 VT, 250/207, 250/214, 323/66, 315/10

[51] Int. Cl. ............H01j 31/50

[58] Field of Search....250/213 VT, 213, 207, 214 R, 250/217 SS; 323/1, 4, 9, 66; 331/113 R; 315/10, 11

[56] References Cited

UNITED STATES PATENTS

| | | | |
|---|---|---|---|
| 3,515,878 | 6/1970 | Ried, Jr. et al. | 250/207 |
| 3,524,986 | 8/1970 | Harnden, Jr. | 250/217 SS X |
| 3,546,626 | 12/1970 | McGhee | 331/113 R |
| 3,581,098 | 5/1971 | Hoover | 250/213 VT |
| 3,631,252 | 12/1971 | Gebel | 250/213 VT |

*Primary Examiner*—Walter Stolwein
*Attorney*—C. Cornell Remsen et al.

[57] ABSTRACT

An automatic brightness control circuit for an image intensifier tube includes direct current limiting means for limiting the output of an oscillator which provides alternating current to a voltage divider supplying high voltages to the cascaded stages of the tube. Means for monitoring the direct current is provided in series with the oscillator or with the tube output electrodes, changes are amplified, compared to a reference and a difference signal applied to the current limiter to control the direct current in the oscillator. Additional means may be provided for monitoring the direct voltage at the oscillator or output stage and for combining the monitored current and voltage signals. Flash response circuitry may also be added to monitor the current in the input electrode or first stage of the tube and temporarily disconnect the high voltage to the output electrode or cut-off the first stage of the tube upon the occurrence of a predetermined current surge.

11 Claims, 7 Drawing Figures

Inventors
MELVIN M. RAMSAY
WILLIAM G. BARNES
By Edward Goldberg
Attorney

Inventors
MELVIN M. RAMSAY
WILLIAM G. BARNES
By Edward Goldberg
Attorney

Inventors
MELVIN M. RAMSAY
WILLIAM G. BARNES
By Edward Goldberg
Attorney

Inventors
MELVIN M. RAMSAY
WILLIAM G. BARNES
By Edward Goldberg
Attorney

Inventors
MELVIN M. RAMSAY
WILLIAM G. BARNES
By Edward Goldberg
Attorney

Inventors
MELVIN M. RAMSAY
WILLIAM G. BARNES
By Edward Goldberg
Attorney

Inventors
MELVIN M. RAMSAY
WILLIAM G. BARNES
By Edward Goldberg
Attorney

AUTOMATIC CONTROL CIRCUIT FOR IMAGE INTENSIFIER

BACKGROUND OF THE INVENTION

1. Field of the Invention

This invention relates to image intensifier systems and in particular to means for providing such systems with an improved form of automatic brightness control.

2. Description of the Prior Art

Image intensifier systems include an image intensifier tube fed from an oscillator via a voltage multiplier, the image intensifier consisting of two or more stages connected in cascade, which system is provided with a form of automatic brightness control by circuitry adapted to form a control signal derived at least in part from a monitoring of the current through a part of the system and to use this control signal to regulate the supply to the oscillator.

If no automatic brightness control means is provided in an image intensifier system, the normal effect of progressively increasing the level of illumination of the scene viewed by the system is firstly to promote increased current flow through the image intensifier causing its output phosphor to be overloaded resulting in the bleaching out of portrayed detail, and subsequently to cause irreversible damage attributable to excessive power dissipation. It is seen therefore that automatic brightness control has two uses, firstly one of protecting the image intensifier from irreversible damage, and secondly one of preventing the loss of information content of the output which would otherwise occur when the image intensifier is used to view rather more brightly illuminated scenes. For a multiple stage image intensifier the first of these functions can be achieved in a previously known manner by inserting a resistor in the common lead from the voltage multiplier to the photocathode of the final stage and the anode of the penultimate stage. With this arrangement, under conditions of relatively intense illumination, the relatively large current flowing in the final stage provides a significant potential difference across this resistor. This means that the potential difference across the final stage itself is correspondingly reduced, while that across the immediately preceding stage is correspondingly increased. The result is a kind of regenerative effect causing the image intensitifer to be turned-off very rapidly with increasing illumination. With a three stage tube this turn-off typically occurs at a level of illumination of less than $10^{-2}$ foot candles which is inconveniently low for many applications.

By monitoring the current flow through a part of an image intensifier system, the same protection against irreversible damage may be obtained whilst permitting more intensely illuminated scenes to be viewed.

One convenient place to monitor the current is at the input to the oscillator, in which case the requisite regulation of the supply of power to the oscillator may be achieved by arranging for the oscillator to be supplied from a current limiting source. Such a device is described in U.S. Pat. No. 3,581,098 issued May 25, 1971, and assigned to the same assignee as the instant application. This method of automatic brightness control extends the operable range of the intensifier system to higher levels of illumination beyond the limit of the operable range afforded by the above described previously known method involving the use of a resistor, but it also turns off at a level of illumination inconveniently low for some applications.

THEORY OF OPERATION

With a multistage image intensifier, however, a further improvement is possible by monitoring only the current flowing in a stage other than the first stage, preferably the final stage, and using a signal representative of this value to regulate the supply of power to the oscillator. That this offers an improvement over the supply from a current limiting source in the extension of the operable range of the system may be deduced from the following considerations. When the light input level increases there is an increase of current flow in the initial stages of the image intensifier. This means that extra power tends to be drawn from the voltage multiplier. Since the supply to the oscillator feeding the voltage multiplier is in both instances regulated, the voltage input to the oscillator is reduced in order to compensate for this increased demand. Therefore the voltage input to the voltage multiplier is reduced, and hence also its voltage output. This results in a reduction of the value of current amplification provided by each stage of the image intensifier, and hence with increasing illumination the magnitudes of the current flow in the initial stages of the intensifier become more significant in comparison with that in the final stage. Therefore the proportional increase in power dissipation in the final stage is smaller than the proportional increase in the total power dissipation in the whole of the image intensifier. Now the current flow in the final stage of the image intensifier is related to the power dissipation in that final stage, while the current flow into the voltage multiplier is substantially similarly related to the total power dissipation in the whole of the image intensifier. Consequently the power limiting effect of regulation is less severe at high light intensities when it is related to conditions pertaining in only the final stage of the image intensifier, than when it is related to current flow into the oscillator, which is effectively equivalent to relating the regulation to equivalent conditions pertaining to the whole of the image intensifier. Another advantage also accrues from monitoring the current flow in the final stage of the image intensifier instead of monitoring the current supply to the oscillator. The monitoring of the behavior of the image intensifier is direct, and hence provides a faster response than the other monitoring system which has to rely upon the effects of the behavior of the image intensifier being relayed back through the voltage multiplier. This advantage is particularly noticeable in the response of the two systems to a rapid change to conditions of lower light input. Additional light amplification is required whenever the light decreases, and this is provided by an increase in the output voltage of the voltage multiplier. In the system in which the current in the third stage of the image intensifier is monitored this voltage output rises relatively rapidly because, not only is the current drain upon the voltage multiplier reduced, but also at the same time, and at the same rate, the voltage feed to the voltage multiplier is augmented. Whereas in the system in which the current is monitored at the input to this oscillator, the reduced current drain from the voltage multiplier, consequent upon the decrease of light, permits its voltage output to begin to rise. This rise in voltage requires additional charge to be stored in the capacitors of the voltage multiplier. Therefore the current demanded by the voltage multiplier drops off more slowly than the current drains from it, and hence also the voltage supply to it increases at a slower rate. Therefore in the system also, not only is the current drain from the voltage multiplier reduced, but at the same time the voltage feed to it is augmented. But the response is slower than that of the other system because the augmenting of the voltage feed takes place at a slower rate.

One advantage of the system in which the current supplied to the oscillator is monitored, is that the high voltage applied across the image intensifier can be of either polarity. That is to say the system can either be constructed to operate with conventional biasing, in which case the photocathode of the first stage is at or near ground potential and the phosphor of the final stage is at a large positive potential; or it can be constructed to operate with reverse polarity, in which case the phosphor of the final stage is at or near ground potential and the photocathode of the first stage is at a large negative potential. In the other system, however, the system in which the current flowing in the final stage is monitored, it would be highly inconvenient to monitor current flow at a point at high potential when the resulting signal has to be applied to circuitry operating at near ground potential, and therefore such systems are preferably constructed to operate with reverse polarity biasing. The particular advantage of being able to use a system constructed to operate with conventional biasing of the image intensifier is that it makes more simple the inclusion of a flash response suppression device.

For operation in an environment subject to short duration flashes of intense illumination a relatively slow-acting automatic brightness control arrangement may be acceptable for dealing with the relatively slower changes in general ambient illumination conditions, provided that it is accompanied by a fast-acting flash response suppression device which will effectively cut-off the operation of the image intensifier during those time intervals in which it would otherwise be responding to the light flashes. One way of achieving this flash response suppression requires the insertion of a resistor in the lead to the photocathode of the first stage of the image intensifier. The potential developed across this resistor is proportional to the current flow and hence is proportional to the incident illumination. This potential is amplified and passed through a high pass filter to a threshold detector whose output is used to operate a relay inserted in the supply lead to one of the subsequent stages of the image intensifier, preferably the lead to the phosphor of the final stage. With this arrangement using a relay in the lead to the phosphor of the final stage, whenever the light input to the image intensifier suddenly increases particularly sharply a signal is produced at the output of the high-pass filter which exceeds temporarily the threshold value of the threshold detector. The output of the threshold detector then causes the opening of the contacts of the relay in the lead to the phosphor of the final stage. After a short duration, whose length is primarily determined by the time constant of the high-pass filter, the relay reverts to its normal condition with the contacts closed, with the result that power is restored to the third stage.

Normally the type of flashes that such a device is required to handle are so short that the additional power dissipation which would result in the absence of any flash response suppression device would be of too short a duration to cause any damage to the image intensifier. The flash response suppression device is therefore required predominantly to shorten the out-of-action time of the image intensifier which results from the observation of these flashes. In the absence of such a device the result of the receipt of a flash of light is that initially the image intensifier draws a large current from the voltage multiplier, with the result that the phosphor of the final stage becomes saturated and whites-out. The large current drain from the voltage multiplier causes its output voltage to drop so that the luminous intensity of the phosphor then fades, whereupon, if the system is provided with an automatic brightness control of the type in which the current supply to the oscillator is monitored, the large current drawn by the voltage multiplier in order to replenish its charge depleted capacitors provides a control signal which produces a drop in the supply voltage, so that now the phosphor blacks-out before finally recovering to its previous intensity level. With the flash response suppression device however, the relatively slow signal propagation time through the image intensifier permits the current surge in the first stage to be used to switch the final stage of a three stage image intensifier before the surge has propagated that far. In this way the final stage, which would normally provide the largest power dissipation, is switched off before it has time to provide an excessive drain upon the charge stored in the voltage multiplier. Therefore, so long as the duration of the flash is not greater than the switch-off time, the image intensifier is ready to resume providing the requisite brightness of output virtually immediately when the final stage is switched on again.

Although in principle it is possible to fit this sort of flash response suppression device to a system in which the image intensifier is supplied with a reverse polarity bias, it is not convenient in practice because under these circumstances the current flow into the first stage is monitored at a potential far removed from ground potential, and this presents considerable difficulties in the design and powering of suitable amplification, high-pass filtering, and threshold detection stages unless a separate floating power supply were employed. Even with conventional polarity biasing of the image intensifier there is difficulty in providing a suitable switch because of the large potential difference existing between the output of the threshold detector and the phosphor of the final stage of the image intensifier.

The systems with current monitoring derived automatic brightness control so far described both suffer to varying degrees from the fact that at high light input intensities the automatic brightness control over-compensates with the result that the output display is diminished in brightness. This results from the fact that both rely upon monitoring 'current' whereas 'power' is a more apposite parameter to monitor. In fact it is easily shown that the brightness of the output phosphor of any stage in an image intensifier depends, in theory at least, upon the power dissipation in that stage. This fact arises because the brightness of the phosphor is proportional to the product of the light amplification of the stage with the light input to that stage. Now the light amplification of a stage is proportional to the energy of the photoeexcited electrons impinging upon the phosphor, and hence is proportional to the potential difference between the phosphor and the photocathode, whereas the initial light input determines the rate of emission of photoexcited electrons and hence the current flow through the stage. Therefore the product of the light amplification with the light input is proportional to the electrical power dissipation in the stage.

Therefore the system in which automatic brightness control is provided by monitoring the current flow in the final stage of the image intensifier may be advantageously modified by arranging also for the potential difference appearing across that stage to be monitored. By using an appropriate potential divider network a suitable signal can be obtained from the monitoring of the potential difference which can be multiplied in an integrated circuit analogue multiplier with the signal derived from monitoring the current flow so as to provide a resultant signal representative of the power dissipation. If, therefore, the regulation of the supply to the oscillator is controlled by this resultant signal, the system is provided with an automatic brightness control whose control signal is in effect derived from monitoring the power dissipation in the final stage of the image intensifier. This system, like the previously described system in which only the current flow in the final stage of the image intensifier is monitored, requires the image intensifier to be supplied with reverse polarity bias in which the phosphor of the final stage of the image intensifier is at or near ground potential while the photocathode of the first stage is held at a large negative potential. Therefore this system cannot conveniently be fitted with the flash response suppression device described above in relation to the system in which automatic brightness control is achieved by monitoring the flow of current supplied to the oscillator. Therefore, although this last described system may be seen to employ the most appropriate method of achieving automatic brightness control insofar as, in theory at least, the control signal is directly proportional to the parameter to be controlled, the system may not be suitable for use in all environments.

Thus for operation in environments where an unsuppressed response to short flashes of intense illumination is unduly harmful to the overall operation of the system it may be preferable to accept a slightly inferior form of automatic brightness control in order to enable incorporating within the system a flash response suppression system of the kind previously described. One such method of automatic brightness control, which, although inferior to the last described method, is nevertheless better than either of the methods relying solely on current monitoring, is provided by the system in which the total power supplied to the oscillator is monitored so that in effect the oscillator is powered from a power limiting source. This system is the 'power' analogue of the first described 'current' system which derives the necessary control signal solely by monitoring the current flow into the oscillator.

A system in which automatic brightness control is obtained by the use of a current limiting feed to the oscillator may simply be converted to this last mentioned system. This requires the insertion of a potential divider across the input terminals of the oscillator so as to be able to derive a signal of appropriate magnitude representative of the voltage applied to the oscillator. The direct connection from the current sensing means to the current regulation means must also be broken to permit the insertion of an analogue multiplier so that the regulation means is now to be driven by a signal representative of the product of the current flow with the potential difference.

It can be demonstrated that this last system does not entirely maintain the brightness of the output of the image intensifier as the illumination increases. This may be deduced from considering the change of power consumption which would be required to give constancy of output as the level of input illumination is increased to a value where unity light gain is required from the minimum value of incident illumination sufficient to provide the requisite brightness of output with the image intensifier operated so as to provide its maximum amplification. A typical stage operated so as to provide its maximum amplification may have a light amplification factor of about 20/50. Therefore when a multi-stage image intensifier composed of substantially identical stages is operated to provide its maximum amplification, little error is introduced by the approximation that the total power consumption in the intensifier is equal to the power consumption in the final stage of the intensifier. On the other hand when the intensifier is required to give unity light gain, equal power will be consumed in each stage. Typically a multistage image intensifier comprises three stages, and hence with this last described method of automatic brightness control the output brightness would drop to a third of its original value. This is considerably less of a drop than would occur with the method of automatic brightness control based solely upon the monitoring of current in the final stage of the intensifier, while with the method of automatic brightness control based upon the monitoring of current flow into the oscillator the system would completely cut-off well before the upper level of illumination were reached.

The comparative advantages and disadvantages of the two systems using the above described methods of automatic brightness control based upon the monitoring of power consumption are analogous with the comparative advantages and disadvantages referred to earlier in relation to the two systems using the earlier described two methods of automatic brightness control based upon the monitoring solely of current flow.

In some types of image intensifier the phosphor of the first stage has a long persistence time associated with intense illumination, and this may even be several minutes in some instances. It is evident that the previously described flash response suppression device will not be very satisfactory in any system where this persistence is much longer than the maximum expected duration of flashes. For this reason it is often preferable to modify the flash response suppression device so that whenever a flash is detected it will quench the operation of the first stage instead of that of the final stage of the image intensifier. One method of achieving this end requires the use of a gateable first stage for the image intensifier, while an alternative method involves the use of a high voltage switch capable of establishing an effective short circuit across the two terminals of a conventional first stage.

SUMMARY OF THE INVENTION

It is therefore the primary object of the present invention to provide an improved automatic brightness control circuit for an image intensifier and particularly to provide novel circuits for monitoring current and voltage changes to control the direct current in an oscillator which supplies the high voltage circuit of the tube. A further object is to provide an improved circuit for flash response suppression of sudden current surges.

This is accomplished by monitoring the direct current changes in the oscillator supply circuit or output portions of the tube, amplifying the resultant signal, comparing the amplified signal to a reference and applying the difference signal to limit current in the oscillator. Direct voltage changes may also be monitored and added to the current changes. Sudden current changes are similarly monitored in the input electrode or first stage of the tube and the high voltage output electrode is disconnected or the first stage is temporarily cut-off upon the occurrence of predetermined current surges. Other objects and advantages will become apparent from the following description in conjunction with the accompanying drawings.

DESCRIPTION OF THE PREFERRED EMBODIMENTS

Figure 1:
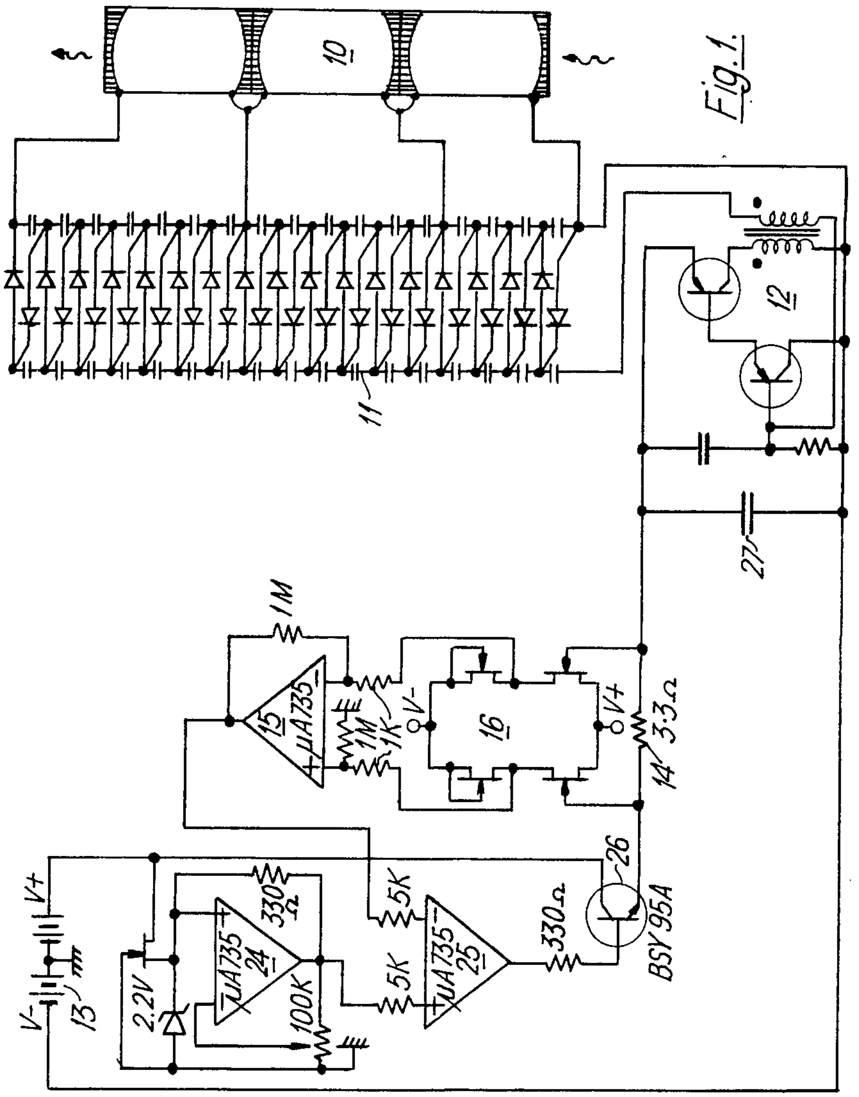
FIGS. 1, 2, 3 and 4 show four image intensifier systems possessing different forms of automatic brightness control systems.

In FIG. 1 there is depicted an image intensifier system incorporating a three stage image intensifier 10, a voltage multiplier 11, and an oscillator 12 powered from a battery 13 via the collector emitter path of a series regulator transistor 26. The current supplied to the oscillator 12 is monitored across a low value resistor 14 inserted in the input lead to the oscillator 12 from the transistor 26. The small voltage signal developed across the ends of this resistor 14, which is representative of the current supplied to the oscillator, is amplified and referred to ground potential in a differential amplifier 15. The signal is however first fed to a direct coupled common drain differential amplifier 16 which acts as an impedance transformer. The output of the differential amplifier 15 is compared with a signal from a settable buffered reference voltage generator 24 in an open loop differential amplifier 25. The output of this differential amplifier 25 is applied to the base of the series regulator transistor 26 so that it shall act so as to limit the supply of current to the oscillator 12 to a value determined by the magnitude of the output of the reference voltage generator 24.

The part of the above described circuit concerned with current limitation is more complicated than the simple current limiting circuit in which current limiting is effected by matching directly the potential difference developed across a resistor inserted in one of the supply leads with that developed across a voltage regulating diode. However it has the advantage that very little of the battery voltage is unavailable for powering the oscillator, whereas in the more simple current limiting circuit the available voltage is equal only to the difference between the battery voltage and the voltage developed across the voltage regulating diode.

A capacitor 27 is placed across the input to the oscillator so as to provide it with a low input impedance to alternating current. This is partly to provide a suitable impedance for the efficient operation of the oscillator 12 and partly to suppress any tendency for high frequency regenerative oscillations to build up round the feedback loop provided by the current limiting circuitry.

The operational amplifiers, which are particularly chosen for their low power consumption, require both positive and negative voltage supplies. These are supplied from the battery 13 which for this purpose is provided with a center tap which is grounded.

Figure 2:
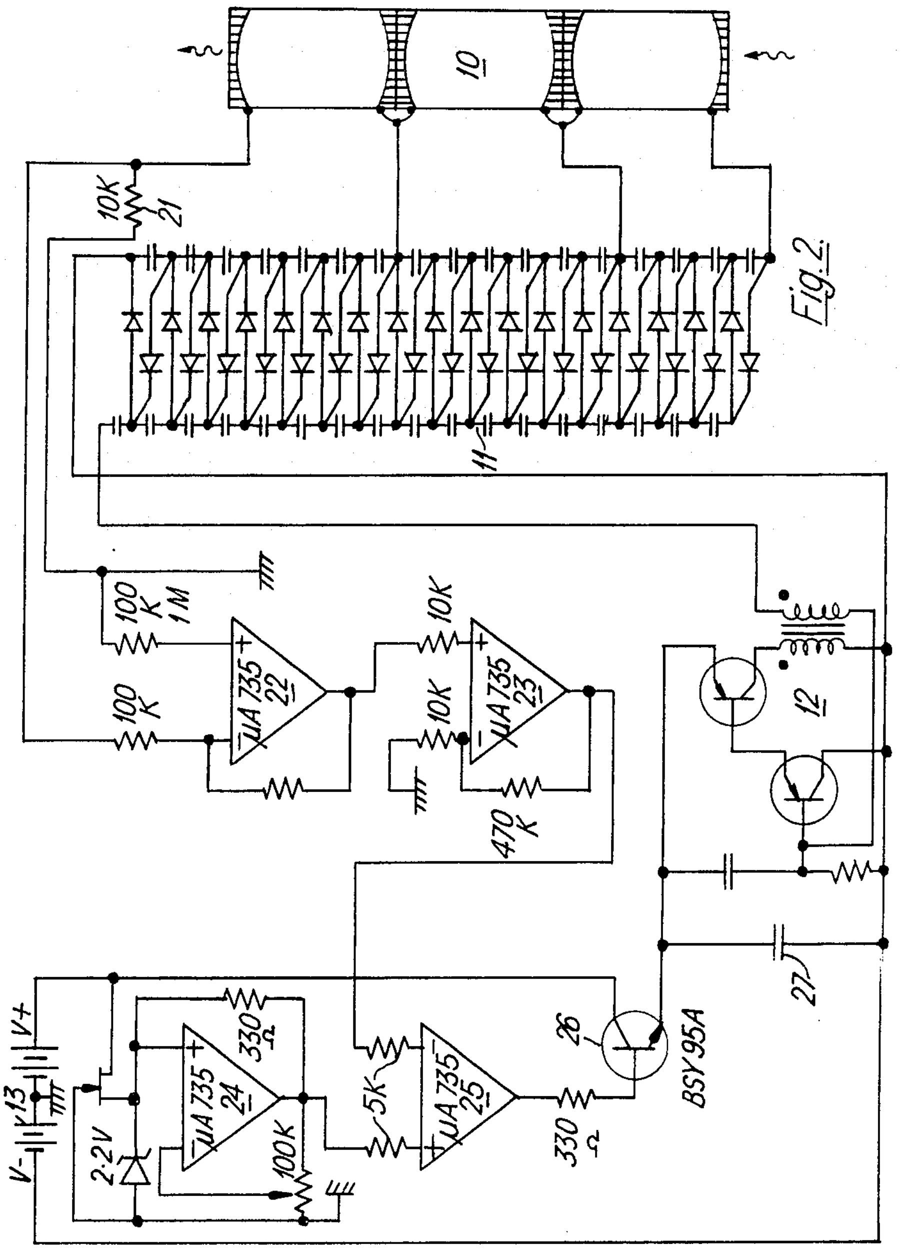

In FIG. 2 there is depicted an alternative image intensifier system. This is similar to the system depicted in FIG. 1, but differs principally from it insofar as the requisite control signal for automatic brightness control is provided by monitoring the current flow in the final stage of the image intensifier 10. This control signal is a voltage signal developed across the ends of a resistor 21 inserted in the lead to the phosphor of the final stage of the image intensifier 10. An inverting amplifier 22 is used to amplify this voltage signal, which is then further amplified by a non-inverting amplifier 23. The output from this amplifier 23 is treated in the same way as that of the differential amplifier 15 of FIG. 1. Thus it is compared with a signal from the settable buffered voltage reference generator 24 in an open loop differential amplifier whose output is taken to the base of the series regulator transistor 26.

Figure 3:
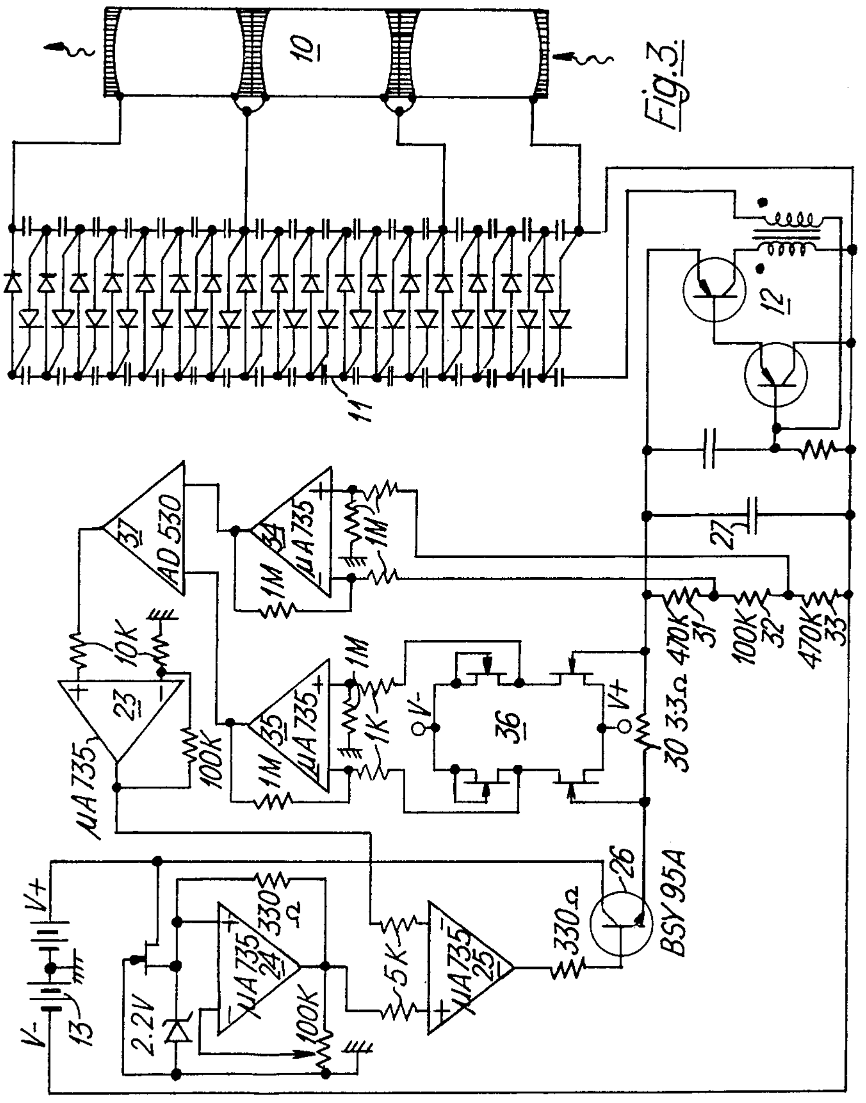

A further alternative image intensifier system is depicted in FIG. 3. This is similar to the two systems described previously with reference to FIGS. 1 and 2 insofar as it incorporates a three stage image intensifier 10, voltage multiplier 11, and an oscillator 12 powered from a battery 13. It is distinguished from the systems of FIGS. 1 and 2 insofar as the automatic brightness control of the system is provided by monitoring not only the current supplied to the oscillator but also the voltage. The signal representative of the current supply is derived from across the ends of a resistor 30; while the signal representative of the voltage supply is derived from across the middle resistor 32 of a potential divider formed by three resistors 31, 32 and 33 connected across the input to the oscillator 12. The signal representative of the voltage supply is referred to ground potential in a differential amplifier 34, while the signal representative of the current supply is similarly referred to ground potential by a differential amplifier 35. This latter signal is first however fed to a direct coupled common drain differential amplifier 36 which acts as an impedance transformer. The resulting two signals issuing from differential amplifiers 34 and 35 are fed to an analogue multiplier 37 to produce an output representative of the power supplied to the oscillator 12. This output from the multiplier is treated in substantially the same way as the output from the inverting amplifier 22 of the system described with reference to FIG. 2. Thus the signal is first amplified using a non-inverting amplifier 23, and then is compared with a signal from a settable buffered reference voltage generator 24 in a further differential amplifier 25. The output of this differential amplifier 25 is applied to the base of a series regulator transistor 26 located in the positive lead between the battery 13 and the oscillator 12. Similarly a capacitor 27 is placed across the input to the oscillator 12.

Figure 4:
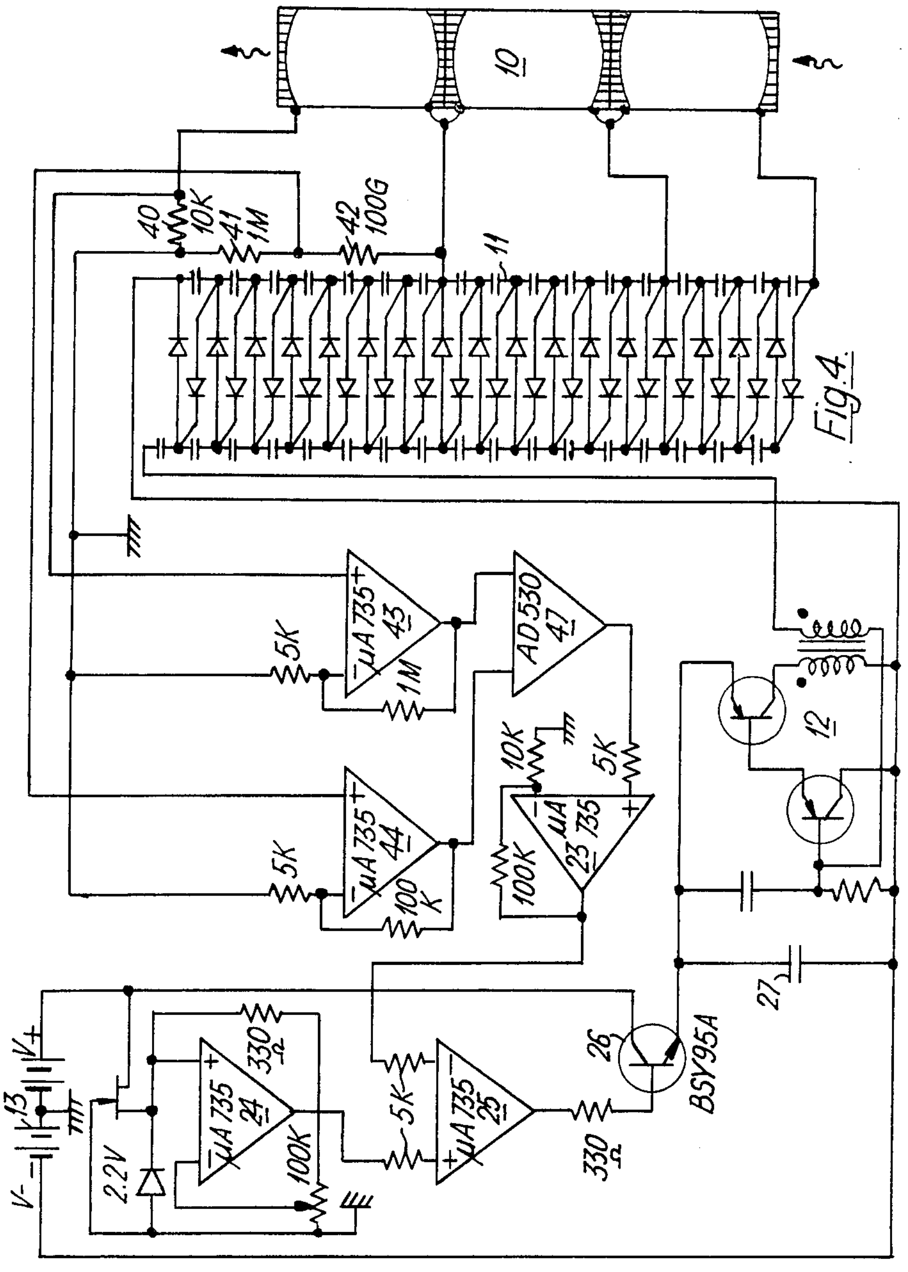

Another image intensifier system is depicted in FIG. 4. This system is similar to the three systems described previously with reference to FIGS. 1, 2 and 3, insofar as it incorporates a three stage image intensifier 10, voltage multiplier 11, and an oscillator 12 powered from a battery 13. It is distinguished from the systems of FIGS. 1, 2 and 3, insofar as the automatic brightness control of the system is provided by monitoring not only the current supplied to the final stage of the image intensifier, but also the voltage developed across that stage. The signal representative of the current in the final stage of the image intensifier is derived from across the ends of a resistor 40 inserted in the lead to the final phosphor; while the signal representative of the voltage developed across that stage is derived from across the ends of a resistor 41 which together with a resistor 42 forms a potential divider placed across the ends of the stage. These two signals are fed to non-inverting amplifiers 43 and 44 respectively. The resulting two signals issuing from the non-inverting amplifiers 43 and 44 are fed to an analogue multiplier 47 to produce an output representative of the power dissipated in the final stage of the image intensifier. This output from the multiplier is treated substantially the same way as the output from the inverting amplifier 22 of the system described with reference to FIG. 2. Thus the signal is first amplified using a non-inverting amplifier 23, and then is compared with a signal from a settable buffered reference voltage generator 24 in a further differential amplifier 25. The output of this differential amplifier 25 is applied to the base of a series regulator transistor 26 located in the positive lead between the battery 13 and the oscillator 12. Similarly a capacitor 27 is placed across the input to the oscillator 12.

Figure 5:
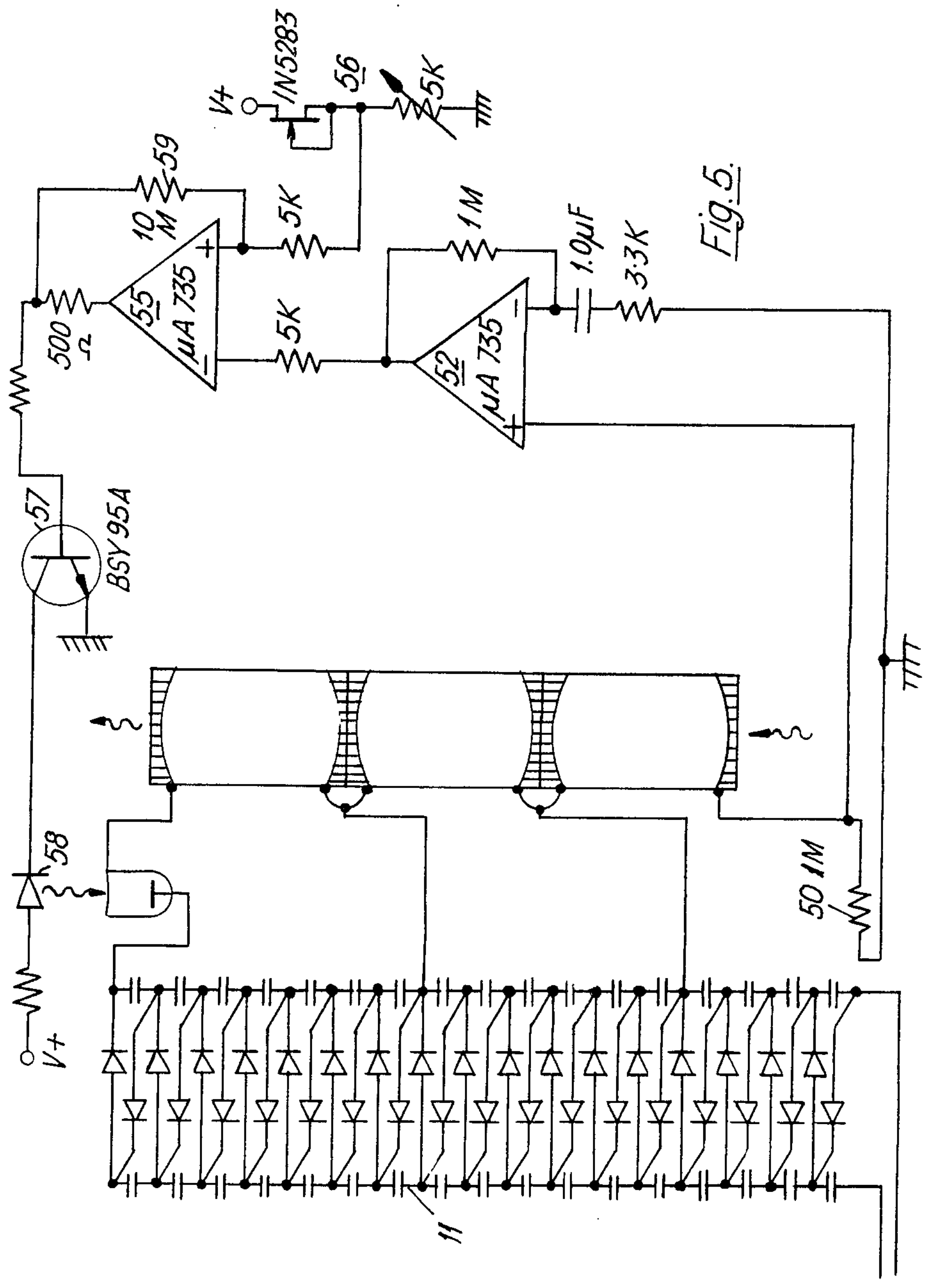
FIGS. 5, 6 and 7 show three ways of modifying the systems of FIGS. 1 and 3 in such a way as to provide them with means for suppressing their normal response to intense flashes of light.

Next to be described is a modification which may be made to either of the systems described with reference to FIGS. 1 and 3. This modification provides a form of protection device constructed to suppress the normal response of the system to short intense flashes of light having a rise time much shorter than the response time of the automatic brightness control. The flash response suppression device circuitry is depicted in FIG. 5, which also shows the three stage image intensifier 10 and the voltage multiplier 11 of the system, but which does not show the oscillator of the system or any of the circuitry preceding the oscillator. The flash response suppression device circuitry is constructed to monitor the current in the first stage of the image intensifier. Large current surges in this stage are used to remove temporarily the high voltage from across the final stage of the image intensifier. For this purpose a resistor 50 is inserted in the lead to the first photocathode of the intensifier and a vacuum photo-diode 51 is inserted in the lead to the final phosphor of the intensifier. The first stage of the image intensifier is monitored for current surges using a high pass amplifier 52 connected across the ends of resistor 50. The output of the high pass amplifier 52 is fed to a threshold detector comprising a differential amplifier 55 with positive feedback one input of which is connected to a settable voltage reference source indicated generally at 56. The output of the threshold detector is connected to the base of a switching transistor 57. Under normal operating conditions the output of the high pass amplifier 52 does not exceed the threshold of the threshold detector, and in this state the switching transistor is switched fully on permitting current to flow through a light emitting diode 58. The light from this diode 58 is directed on to the photocathode of the vacuum photo-diode 51, thereby maintaining it in its low impedance state, and hence providing an effective connection between the phosphor of the final stage of the image intensifier and the voltage multiplier. The high pass amplifier 52 effectively differentiates the current response of the first stage of the image intensifier to changes of incident illumination. A sudden increase in illumination therefore produces a pulse output from this high pass amplifier. If the increase is rapid enough, the amplitude of the resulting pulse will exceed temporarily the threshold of the threshold detector. Under these circumstances the switching transistor 57 is turned off, the light from the diode 58 is extinguished, and the vacuum photo-diode 51 is caused to go into its high impedance state, thereby effectively removing the supply from the final stage of the image intensifier. At the end of the pulse the switching transistor is switched back on, light from the light emitting diode causes the vacuum photodiode to revert to its low impedance state, and power is again restored to the final stage of the image intensifier. It is thus seen that the switching transistor 57, the light emitting diode 58 and the vacuum photodiode 51 co-operate to form a type of opto-electronic relay. An optical coupling for this relay has been chosen partly because substantially the full voltage output of the voltage multiplier, typically 45 kV, appears between the switching part of the relay and the part to be switched, and also because when the switched part of the relay is in its open circuit condition it has to be able to withstand between its ends approximately one third of the output voltage of the voltage multiplier and present a leakage resistance, typically of the order 10 gigaohms, large compared with the resistance value presented by the final stage under conditions of normal brightness of output. A resistor 59 is connected across the differential amplifier 55 so as to establish positive feedback and hence a measure of hysteresis in the operation of the threshold detector circuitry.

Figure 6:
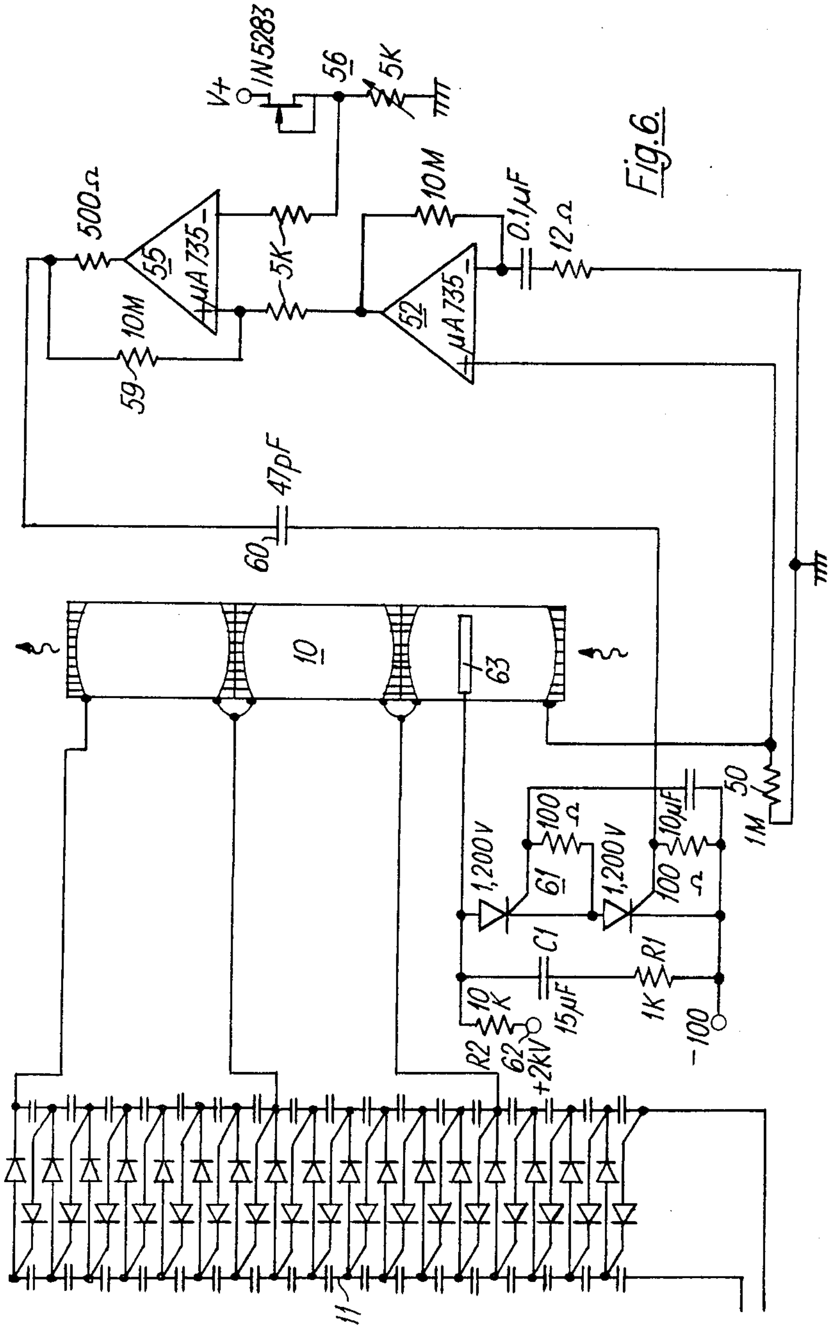

It has been explained that in systems incorporating an image intensifier with a first stage phosphor having a long persistence time it is preferable to achieve flash response suppression by quenching the operation of the first stage instead of the final stage as in the device of FIG. 5. This quenching may be achieved either by removing the power supply from across the ends of a conventional first stage, or by substituting a gated image intensifier for the first stage and applying a suitable gating voltage. A flash response suppression device of the second kind, and suitable for incorporation with either of the systems depicted in FIGS. 1 and 3, is depicted in FIG. 6. This figure also shows the three stage image intensifier 10 and the voltage multiplier of the system, but does not show the oscillator or any of the circuitry preceding the oscillator. The flash response suppression device of FIG. 6 is somewhat similar to that of FIG. 5 insofar as current surges in the first stage of the image intensifier are monitored by a high pass amplifier 52 connected across the ends of a resistor 50 inserted in the lead to photocathode of the gateable first stage of the image intensifier 10. Similarly the output of the high pass amplifier 52 is fed to a threshold detector comprising a differential amplifier 55, one input of which is connected to a settable voltage reference source indicated generally at 56. In this circuit of FIG. 6 the inputs to the differential amplifier 55 have however been reversed so as to reverse the polarity of its output. The output of the threshold detector is fed via a capacitor 60 to the trigger gate of a thyristor chain 61 so that whenever the threshold is exceeded the thyristor chain will crowbar a storage capacitor C1 connected in series with a current limiting resistor R1. This capacitor is continually being charged from a high voltage supply 62 so that the gating electrode 63 of the gateable first stage of the image intensifier shall normally be held at the requisite potential (2 kV) for the operation of this stage. This stage is completely cut-off when the potential on the gating electrode is taken to −100 volts with respect to its photocathode. Therefore when the threshold detector produces a pulse, the thyristor chain is fired, the potential of the gating electrode is very rapidly lowered, and the first stage of the image intensifier is cut-off. It remains in this cut-off condition for as long as the current discharging the capacitor C1 through the resistor R1 and the thyristor chain exceeds the holding current of the thyristor chain. When the current drops beneath this value the gating electrode is restored to its normal operating potential at a rate depending upon the time constant determined by the charging of the capacitor C1 through the series combination of resistors R1 and R2. Preferably this time constant is chosen to correspond with the response time of the automatic brightness control so that the stage shall be cut-off for the expected maximum duration of individual flashes, and thereafter shall revert to normal operation as quickly as possible without overtaxing the ability of the automatic brightness control to prevent the overloading of the final phosphor of the image intensifier.

In the foregoing discussion it was implicitly assumed that the light output of the gateable first stage is substantially linearly related to the potential difference between its phosphor and its gating electrode. Certain types of gateable image intensifier depart significantly from this relationship insofar as only a small fraction of the required operating potential is sufficient to turn the stage fully on, the remainder of the potential difference being required for focusing. If therefore this type of gateable image intensifier is used the circuitry of FIG. 6 has to be modified (in a way not illustrated in the drawings) by arranging for the recharging rate to be matched to the response of the automatic brightness control circuitry for an initial period until the intermediate voltage is reached at which the stage is fully on, whereupon a relay is triggered so as to shunt for a limited time the resistor R2 thereby providing a much more rapid rate of charge so that the image of the scene under observation may then be rapidly brought into focus upon the output phosphor.

Figure 7:
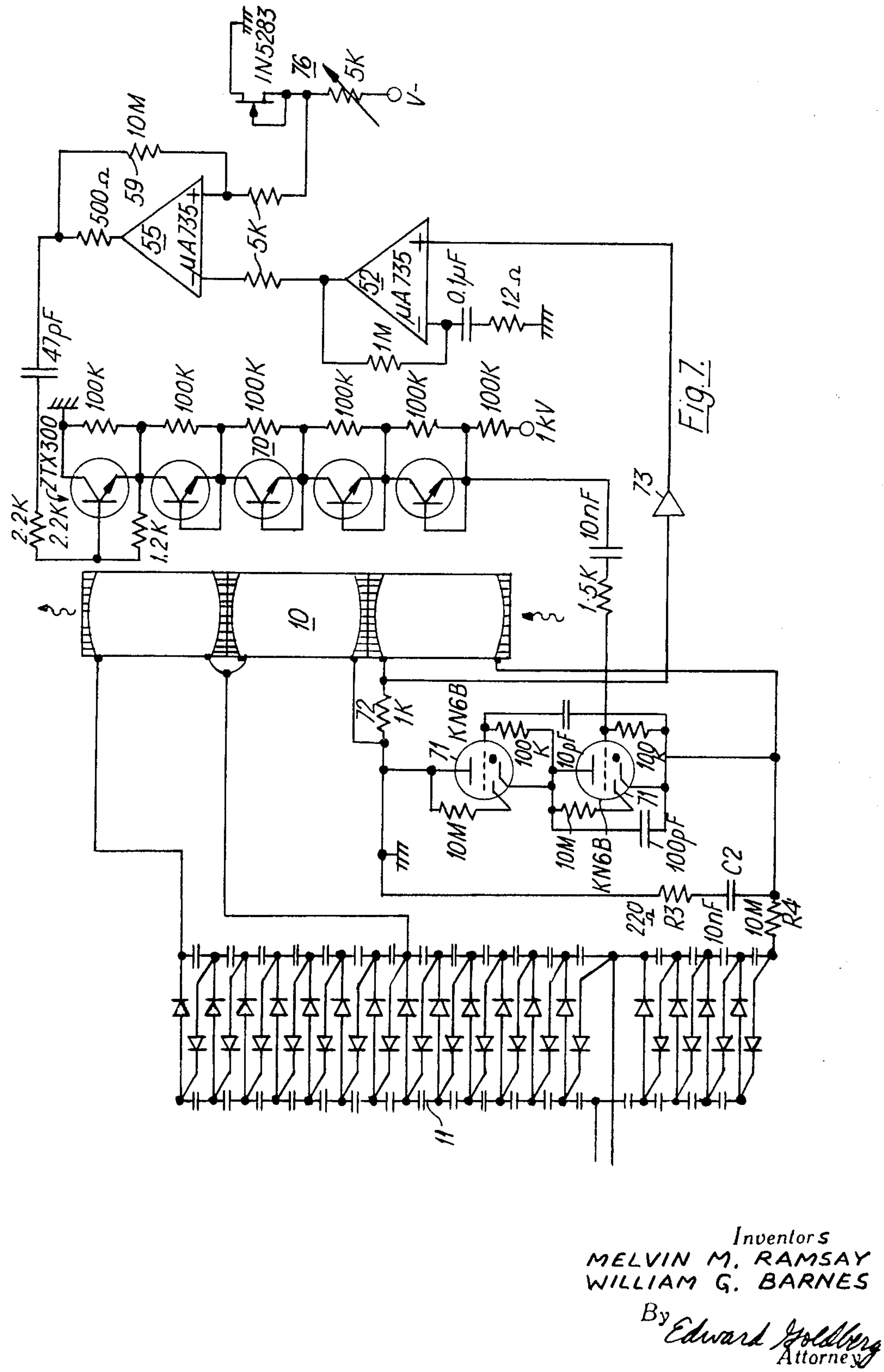

A drawback of the means of flash response suppression described with reference to FIG. 6 is that it involves the use of a special first stage for the image intensifier. This is a practical disadvantage insofar as the performance of a multistage image intensifier is most critically dependent upon the performance of the first stage, and hence the first stages of such image intensifiers are normally obtained by selecting only the tested best from a batch of image intensifier stages. The use of a special first stage can be avoided by modifying the circuitry of FIG. 6 so that an output from the threshold detector shall cause the effective short circuiting of the whole potential applied across a conventional first stage (typically up to 15 kV) instead of merely the potential applied to the gating electrode of a gateable image intensifier stage (typically up to 2 kV). A circuit, employing two krytrons (cold cathode gas filled thyrotrons) for this purpose, is illustrated in FIG. 7, which depicts a flash response suppression device suitable for incorporation with either of the two systems depicted in FIGS. 1 and 3. This figure also shows the three stage image intensifier 10 and the voltage multiplier 11 of the system, but does not show the oscillator or any of the circuitry preceding the oscillator. In order that the potentials appearing across the second and final stages of the image intensifier shall not be changed whenever the first stage is short circuited, the voltage multiplier 11 is modified for the purposes of this circuit so that the phosphor of the first stage of the image intensifier and the photocathode of the second shall be at near ground potential. This means that the voltage multiplier is constructed to provide positive potentials for the phosphors of the second and final stages of the image intensifier and a negative potential for the photocathode of the first stage of the image intensifier. The flash response suppression device of FIG. 7 is somewhat similar to those of FIGS. 5 and 6 insofar as current surges in the first stage of the image intensifier are monitored by a high pass amplifier 52 whose output is fed to a threshold detector. Since the photocathode of the first stage is not near ground potential the current surges are monitored across the ends of a resistor 72 inserted in the lead to the phosphor of the first stage of the image intensifier 10 which is near ground potential. The value of the monitoring resistor 72 should be kept as small as conveniently possible because it is necessarily in series with the first stage of the image intensifier across which it will later be shown that it is desired to be able to establish an effective short circuit. Hence an additional non-inverting amplifier 73 is inserted between this resistor and the input to the high pass amplifier 52 to compensate for the reduced signal level. The threshold detector comprises a differential amplifier 55 one input of which is connected to a settable voltage reference source indicated generally at 76. In this circuit of FIG. 7 the polarity of the output of the high pass amplifier 52 is reversed because its input is effectively monitoring current in the lead to the phosphor of the first stage instead of that in the lead to its photocathode. For this reason the settable voltage reference source 76 is constructed to provide a negative reference voltage, and the connections to the differential amplifier 55 are the opposite of those of the corresponding differential amplifier of the circuit depicted in FIG. 6 so that in each case the output is normally negative, and is only driven positive when current surges are detected. The output of the threshold detector is employed to trigger an avalanche transistor chain 70 which is capable of producing a fast rising pulse of sufficient magnitude to switch two series connected krytrons 71. The switching of these krytrons puts an effective short circuit across the first stage of the image intensifier, the value of the residual resistance being primarily determined by the value of the resistors. This short circuit is maintained while a capacitor C2 discharges through the series combination of a resistor R3 and the two krytrons. Then, once this discharging current drops beneath the level required to retain the two krytrons in their switched on condition, the potential is restored to the first stage of the image intensifier at a rate determined principally by the time constant involved in the charging of the capacitor C2 through the series combination of the resistor R3 and a resistor R4 inserted in the negative going output lead of the voltage multiplier 11.

It may be noted that the mechanism determining the flash response suppression time is different in each of the three circuits described with reference to FIGS. 5, 6 and 7. Thus in the circuit of FIG. 5 the out-of-action time is determined primarily by the time it takes for the output of the high pass differential amplifier to drop beneath the threshold level set by the threshold detector. In the circuit of FIG. 6 the out-of-action time is determined primarily by the time for which the current discharging the capacitor C1 through the resistor R1 exceeds the holding current of the thyristors 61. Thereafter the rate of recovery is matched to the rate of response of the automatic brightness control circuitry with which it is used. In the circuit of FIG. 7 the out-of-action time is in part determined by the time for which the current discharging the capacitor C2 through the resistor R3 exceeds the holding current of the krytrons 71, but this part of the out-of-action time is augmented by another part determined by the rate of recovery, and being the time during which the potential applied across the first stage is beneath a critical threshold level, typically about 2 kV, below which the photo-excited electrons are unable to excite the phosphor because they have insufficient energy to penetrate the thin metallic backing of the phosphor. The rate of recovery in this circuit, like that of the circuit of FIG. 6 is chosen to match the rate of response of the automatic brightness control circuitry with which it is used.

It is to be understood that the foregoing description of specific examples of this invention is made by way of example only and is not to be considered as a limitation on its scope.

What is claimed is:

1. An image intensifier brightness control system comprising:

an image intensifier tube having a photocathode input electrode and phosphor screen output electrode and a plurality of intermediate cascaded image intensifier stages therebetween, each stage including a photocathode and phosphor screen;

a voltage multiplier applying direct voltages between said input and output electrodes and cascaded stages;

an oscillator circuit applying an alternating voltage to said voltage multiplier;

a direct current source;

direct current limiting means connected between said direct current source and oscillator for controlling the direct current supplied to said oscillator;

means for monitoring the direct current in a portion of said system and providing a first signal voltage in proportion thereto;

means providing a reference signal voltage means for amplifying said first signal voltage;

means for comparing said amplified first signal voltage with said reference signal voltage to provide a difference signal; and means coupling said difference signal to said direct current limiting means to control the direct current to said oscillator.

2. The device of claim 1 wherein said means for monitoring said direct current is in series with said oscillator.

3. The device of claim 1 wherein said means for monitoring said direct current is in series with said output electrode.

4. The device of claim 2 including means for monitoring the direct voltage supplied to said oscillator and providing a second signal voltage in proportion thereto, means for amplifying said second signal voltage, means for combining said first and second amplified signal voltages, means for comparing said combined amplified first and second signal voltages with said reference signal voltage to provide a difference signal for controlling said direct current limiting means and said oscillator.

5. The device of claim 3 including means for monitoring the direct voltage across the output stage and providing a second signal voltage in proportion thereto, means for amplifying said second signal voltage, means for combining said first and second amplified signal voltages, and means for comparing said combined amplified first and second signal voltages with said reference signal voltage to provide a difference signal for controlling said direct current limiting means and said oscillator.

6. The device of claim 2 including flash response means for suppressing large current surges, said flash response means including means for monitoring the direct current in said input electrode and providing a third signal voltage in response thereto, means for amplifying said third signal voltage, threshold means for comparing said amplified third signal voltage with said reference signal voltage to provide a difference signal, switching means connected to said threshold means and having a normally conducting state, light emitting diode means connected to said switching means to emit light during said conducting state, a photodiode connected between said output electrode and said voltage multiplier and arranged to receive light from said light emitting diode means and to be in a low impedance conducting state when receiving said light, said threshold means causing said switching means to turn off upon occurrence of a predetermined current surge in said input electrode to stop light emission from said light emitting diode and cause said photodiode to be in a high impedance state to temporarily disconnect said output electrode direct voltage.

7. The device of claim 4 including flash response means for suppressing large current surges, said flash response means including means for monitoring the direct current in said input electrode and providing a third signal voltage in response thereto, means for amplifying said third signal voltage, threshold means for comparing said amplified third signal voltage with said reference signal voltage to provide a difference signal, switching means connected to said threshold means and having a normally conducting state, light emitting diode means connected to said switching means to emit light during said conducting state, a photodiode connected between said output electrode and said voltage multiplier and arranged to receive light from said light emitting diode means and to be in a low impedance conducting state when receiving said light, said threshold means causing said switching means to turn off upon occurrence of a predetermined current surge in said input electrode to stop light emission from said light emitting diode and cause said photodiode to be in a high impedance state to temporarily disconnect said output electrode direct voltage.

8. The device of claim 2 including flash response means suppressing large current surges, said flash response means including means for monitoring the direct current in said input electrode and providing a third signal voltage in response thereto, means for amplifying said third signal voltage, threshold means for comparing said amplified third signal voltage with said reference signal voltage to provide a difference signal, a gating electrode in the first stage of said image intensifier, means for connecting a first direct voltage to said gating electrode, switching means for connecting a second direct voltage to said gating electrode, and trigger means connected between said threshold means and switching means to trigger said switching means to connect said gating electrode to said second direct voltage to temporarily cut-off said intensifier tube upon the occurrence of a predetermined current surge in said input electrode.

9. The device of claim 4 including flash response means for suppressing large current surges, said flash response means including means for monitoring the direct current in said input electrode and providing a third signal voltage in response thereto, means for amplifying said third signal voltage, threshold means for comparing said amplified third signal voltage with said reference signal voltage to provide a difference signal, a gating electrode in the first stage of said image intensifier, means for connecting a first direct voltage to said gating electrode, switching means for connecting a second direct voltage to said gating electrode, and trigger means connected between said threshold means and switching means to trigger said switching means to connect said gating electrode to said second direct voltage to temporarily cutoff said intensifier tube upon the occurrence of a predetermined current surge in said input electrode.

10. The device of claim 2 including flash response means for suppressing large current surges, said flash response means including means for monitoring the direct current in the first stage of said image intensifier tube and providing a third signal voltage in response thereto, means for amplifying said third signal voltage, threshold means for comparing said amplified third signal voltage with said reference signal voltage to provide a difference signal, means for connecting a first direct voltage across said first stage, switching means for connecting a second direct voltage across said first stage, and trigger means connected between said threshold means and switching means to trigger said switching means to connect said second direct voltage across said first stage to temporarily cut-off said intensifier tube upon the occurrence of a predetermined current surge in said input electrode.

11. The device of claim 4 including flash response means for suppressing large current surges, said flash response means including means for monitoring the direct current in the first stage of said image intensifier tube and providing a third signal voltage in response thereto, means for amplifying said third signal voltage, threshold means for comparing said amplified third signal voltage with said reference signal voltage to provide a difference signal, means for connecting a first direct voltage across said first stage, switching means for connecting a second direct voltage across said first stage, and trigger means connected between said threshold means and switching means to trigger said switching means to connect said second direct voltage across said first stage to temporarily cut-off said intensifier tube upon the occurrence of a predetermined current surge in said input electrode.

* * * * *